US00RE50926E

(19) United States
(12) Reissued Patent
Popa

(10) Patent Number: US RE50,926 E
(45) Date of Reissued Patent: Jun. 23, 2026

(54) METHOD AND DEVICE FOR MAKING WIRE BASKETS

(71) Applicant: NYP LLC, Lumberton, NC (US)

(72) Inventor: Laurentiu Popa, Hamilton (CA)

(73) Assignee: NYP LLC, Lumberton, NC (US)

(21) Appl. No.: 18/475,667

(22) Filed: Sep. 27, 2023

Related U.S. Patent Documents

Reissue of:
(64) Patent No.: 11,154,923
Issued: Oct. 26, 2021
Appl. No.: 16/179,451
Filed: Nov. 2, 2018

U.S. Applications:
(60) Provisional application No. 62/584,378, filed on Nov. 10, 2017.

(51) Int. Cl.
*B21F 45/00* (2006.01)
*B21F 15/06* (2006.01)
*B21F 15/08* (2006.01)
*B21F 27/12* (2006.01)

(52) U.S. Cl.
CPC ..... *B21F 45/00* (2013.01); *B21F 15/06* (2013.01); *B21F 15/08* (2013.01); *B21F 27/12* (2013.01)

(58) Field of Classification Search
CPC ..... B21F 45/00; B21F 15/00; B21F 15/02; B21F 15/06; B21F 15/08; B21F 27/12
USPC ..... 140/92.1
See application file for complete search history.

(56) References Cited

U.S. PATENT DOCUMENTS 113,779 A * 4/1871 Lantham ..... B21F 45/00 140/149
3,437,114 A * 4/1969 Whitacre ..... B21F 27/124 140/112
4,062,147 A 12/1977 Phillips
4,372,351 A * 2/1983 Myers ..... B21F 27/12 140/112
4,391,030 A * 7/1983 Weidner ..... A01G 23/04 29/509
4,478,260 A 10/1984 Eichler
4,807,393 A 2/1989 Bracken
D311,666 S * 10/1990 Burke ..... B21F 27/124 D8/1

(Continued)

FOREIGN PATENT DOCUMENTS

CA 2638169 A1 * 2/2009 ..... A01G 23/04

*Primary Examiner* — William V Gilbert
(74) *Attorney, Agent, or Firm* — Devlin Law Firm LLC

(57) ABSTRACT

A device and method for making a wire basket, the device having a spinning fixture with a top plate with an outer periphery, arms attached at a top end at the periphery of the top plate and projecting downwardly, such that bottom ends of the arms collectively form a circular arrangement having a diameter greater than the diameter of the top plate, a means for guiding wire onto the spinning fixture such that the wire is wound onto the spinning fixture in a preselected pattern, and contacts to maintain the wire onto the spinning fixture in preselected locations, and the method including providing an apparatus for delivery of wire through a wire feed and for translating the wire feed lineally along a traverse, providing a spinning fixture for winding wire thereon, and winding a preselected pattern of wire onto the spinning fixture by translating the wire feed along the transverse.

18 Claims, 15 Drawing Sheets

(56) References Cited

U.S. PATENT DOCUMENTS

| | | | | |
|---|---|---|---|---|
| 5,025,590 | A | 6/1991 | Smith | |
| 5,419,695 | A * | 5/1995 | Clegg | B29C 59/04 425/363 |
| D649,220 | S | 11/2011 | Vreeland | |

* cited by examiner

METHOD AND DEVICE FOR MAKING WIRE BASKETS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This patent application claims priority on and the benefit of US Provisional Patent Application No. 62/584,378 having a filing date of 10 Nov. 2018.

BACKGROUND OF THE INVENTION

Field of the Invention

The present invention relates to the production of wire baskets and more particularly to a machine that quickly and efficiently manufactures wire baskets used to hold the root ball system of trees and/or shrubs.

Background of the Invention

Within the nursery industry, baskets of various types are used extensively in the display and transport of machine dug trees and shrubs. The baskets secure the root ball of the plant firmly to prevent deterioration during handling and transportation; and allow for easy transportation of the tree or shrub.

Commonly the baskets are comprised of an exterior framework of wire wound in a basket-shaped grid structure, with an interior lining of burlap, or another material that holds the root ball intact, while allowing access to moisture and nutrients.

The wire baskets which serve to reinforce the lining are commonly manufactured by joining together several individual strands of wire to form a grid structure having the required size and shape. It is a relatively costly and complex task that requires so many individual strands of wire to be aligned together, and joined, to form the desired final shape. The degree of complexity of the task is increased in proportion to the variety of sizes and shapes required to be produced. The task of forming and joining the wire strands is often, at least in part, performed manually, and it can be appreciated that such a process will require considerable skill on the part of the worker.

Some baskets are machine made using a complicated process consisting of forming loops going up and down along the side of the basket then winding the wire in a spiral around the side of basket. This makes an open bottom basket. To close the bottom an additional operation is required to bend the end of loops towards the center of the basket. See U.S. Pat. No. 4,478,260, Eichler; Manfred, Oct. 23, 1984. Whether the baskets are made of several strands of wire or of a continuous strand, after placing the tree in the basket it is necessary to crimp the wire in a number of places around the root ball to tighten the basket on the root ball. There is a need to overcome such difficulties by providing a method to produce wire baskets with closed bottom in a continuous operation from a continuous strand of wire that will hug tightly the root ball needing no crimping or little if any at all, using a relatively simple, efficient, inexpensive technique.

BRIEF SUMMARY OF THE INVENTION

The present concept is a device for making wire baskets and includes a rotating spinning fixture with a circular top plate with an outer periphery. It further includes at least three arms attached at a top end of the periphery of the top plate and projecting downwardly at an angle theta relative to the vertical, such that the bottom end of the arms are at a diameter greater than the diameter greater than the top plate. The device further includes a means for guiding wire on to the spinning fixture such that as the spinning fixture is rotated the wire is wound on to the spinning fixture on a preselected pattern. The spinning fixture further includes further contacts to locate the wire on to the spinning fixture in preselected locations.

Preferably the guiding means includes a wire feed connected to a traverse which is adapted to translate the wire feed along the traverse which is oriented substantially parallel to the arms on an angle theta relative to the vertical.

The present concept is a method for making wire baskets which includes providing a traverse apparatus for delivery of wire through a wire feed and for translating the wire feed linearly along the traverse. Preferably providing a rotatable spinning fixture for winding wire, wherein, the wire is received from the wire feed and is wound on to the spinning fixture. Finally, winding a pre-selected pattern of wire on to the spinning fixture is accomplished by selectively translating the wire feed along the traverse and simultaneously rotating the spinning fixture.

BRIEF DESCRIPTION OF THE DRAWINGS

The present invention will now be described by way of example only with reference to the following drawings in which.

DETAILED DESCRIPTION OF PREFERRED EMBODIMENTS

Figure 1:
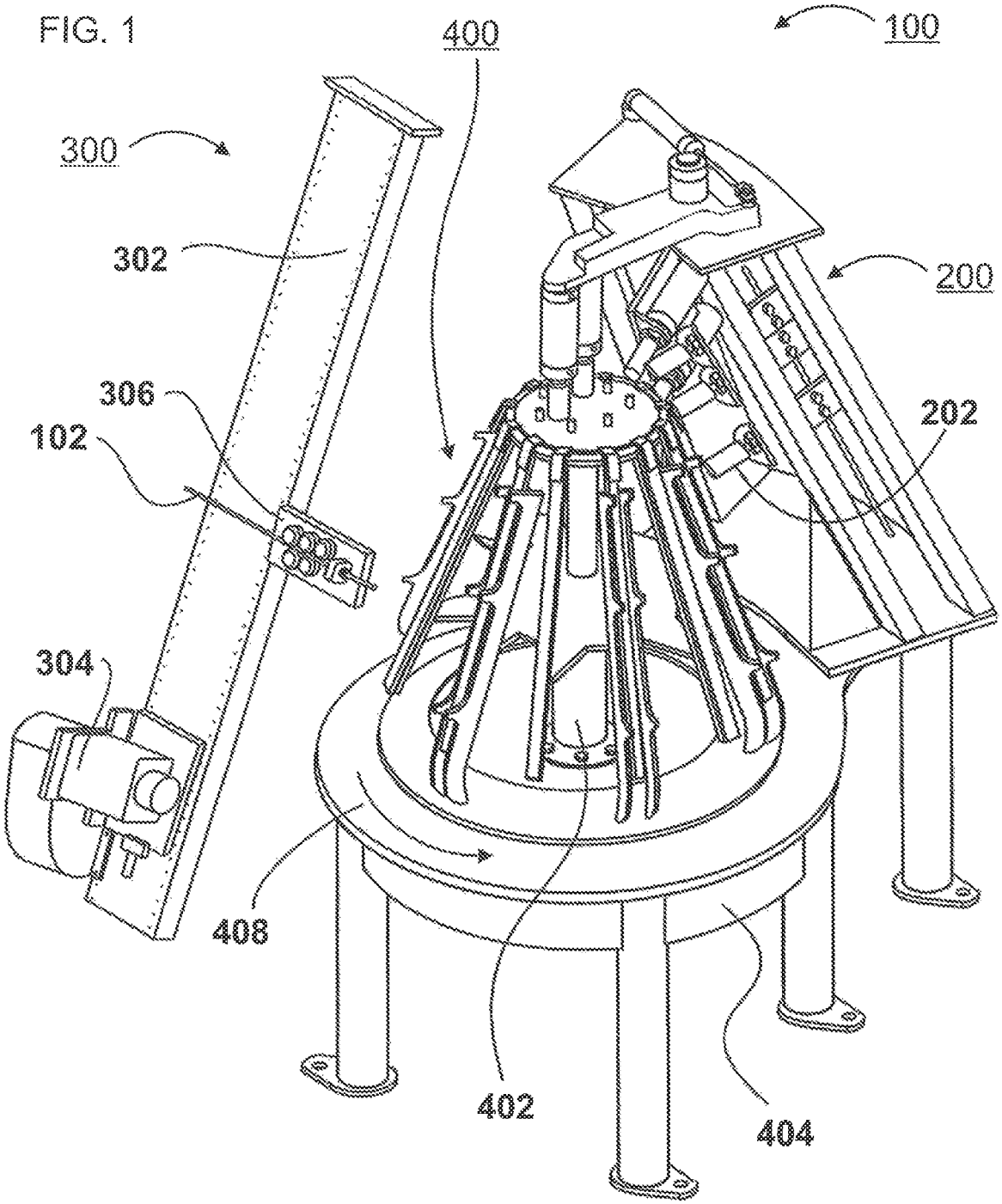
FIG. 1 is a schematic top front perspective view of a wire basket former including a welding apparatus, spinning fixture, and traverse drive.

First referring to FIG. 1 which shows wire basket apparatus 100 which is comprised of spinning fixture 400 mounted on table 404, traverse apparatus 300, welding apparatus 200 and shear actuator 500 (not shown in FIG. 1). Spinning fixture 400 rotates in spin direction 408 relative to traverse apparatus 300 and welding apparatus 200.

Figure 2:
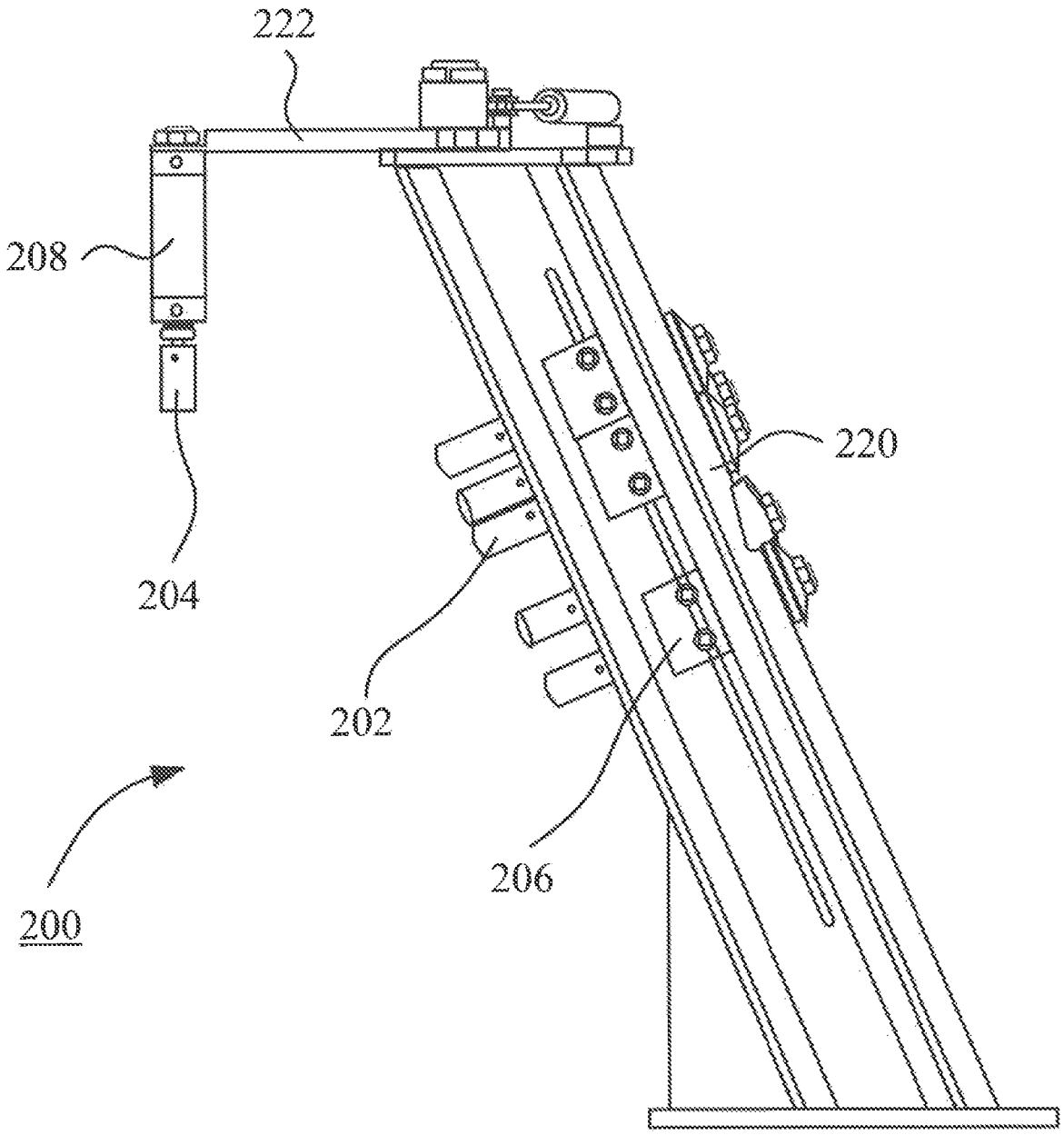
FIG. 2 is a schematic side plan view of the welding unit.

Referring now to FIG. 2 which shows welding apparatus 200 which is comprised of main welding apparatus body 220 from which five side welding electrodes 202 are attached on the side with side electrode advance mechanisms 206 and one top welding electrode 204 which is connected to the main welding apparatus body 220 via top electrode arm 222 and top electrode advance mechanism 208. There are in fact two top welding electrodes 204, the second hidden from view.

Figure 3:
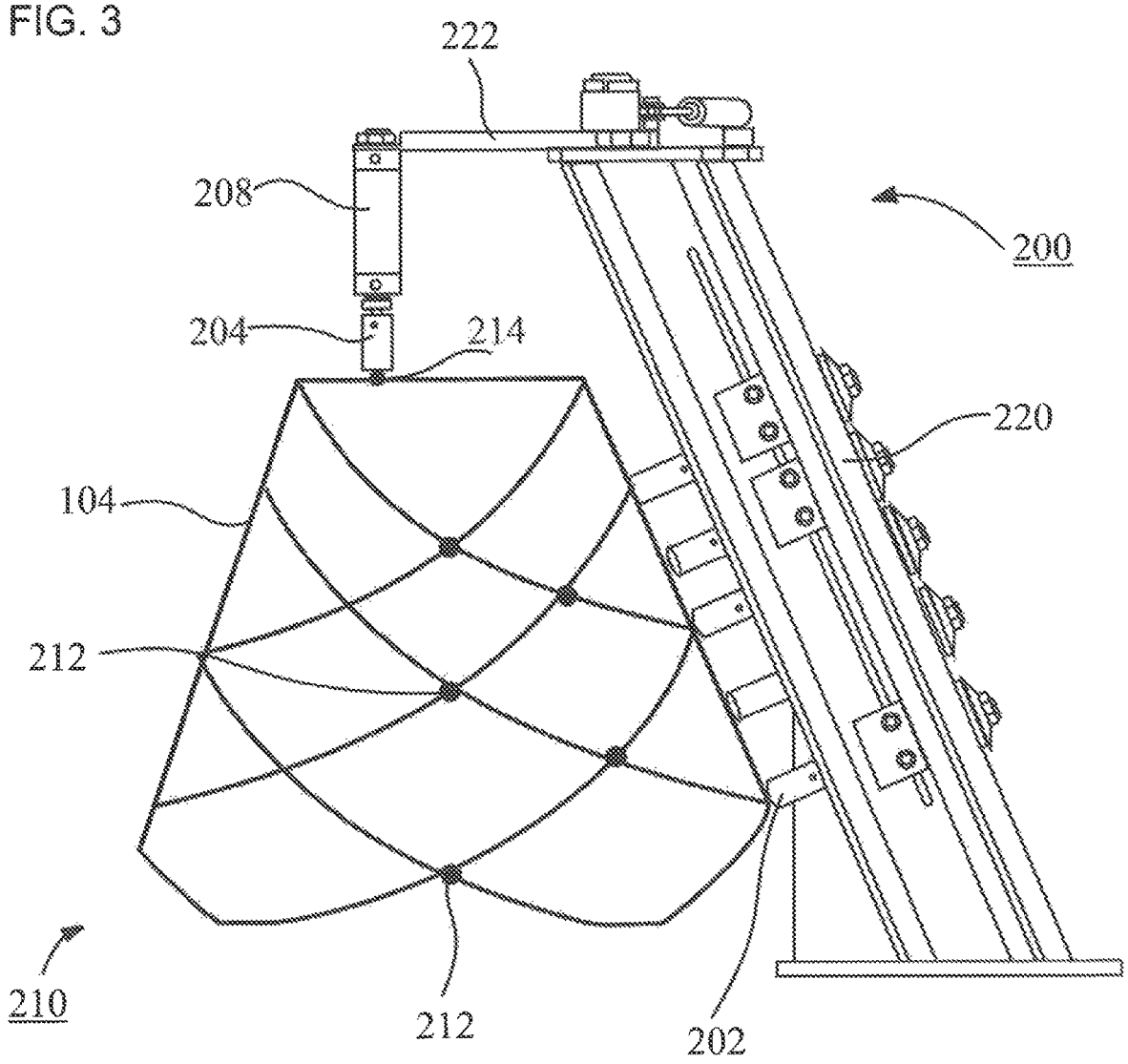
FIG. 3 is a schematic side plan view of the welding apparatus in use in welding a wire basket.

Referring now to FIG. 3 which shows welding apparatus 200 in use with wire basket 104. Side electrodes 202 make five side welds at side weld positions 212 and top electrode 204 makes welds at top weld positions 214. The welds are depicted as solid round dots.

Figure 4:
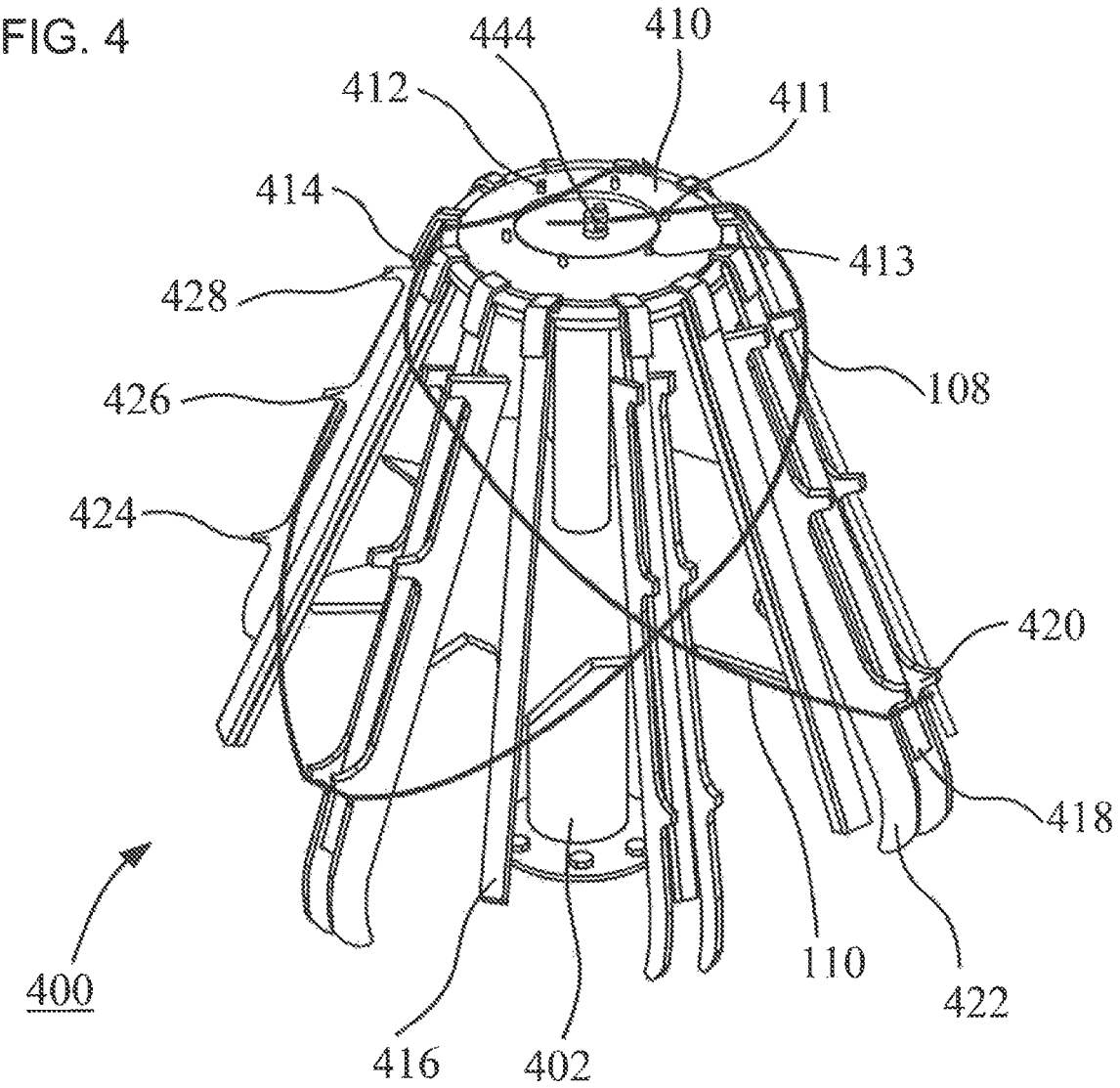
FIG. 4 is a schematic representation of the spinning fixture depicting the wire forming path.

Referring now to FIG. 4 which shows spinning fixture 400 which is comprised of main shaft 402 with top plate 410 on top of main shaft 402 from which six copper arms without prongs 416 and six cooper arms with prongs 418 extend radially downward from top plate 410. Copper arms without prongs 416 and copper arms with prongs 418 are connected to top plate 410 by arm shoulders 414 and are evenly spaced around the circumference of top plate 410, with copper arms without prongs 416 alternating with copper arms with prongs 418.

Copper arms without prongs 416 are long, rectangular members while copper arms with prongs 418 include the same long rectangular member with side plates 422 that have retractable positioning prongs 420. Each copper arm with prongs 418 has three positioning prongs 420: lower prong 424, middle prong 426 and upper prong 428.

Figure 5:
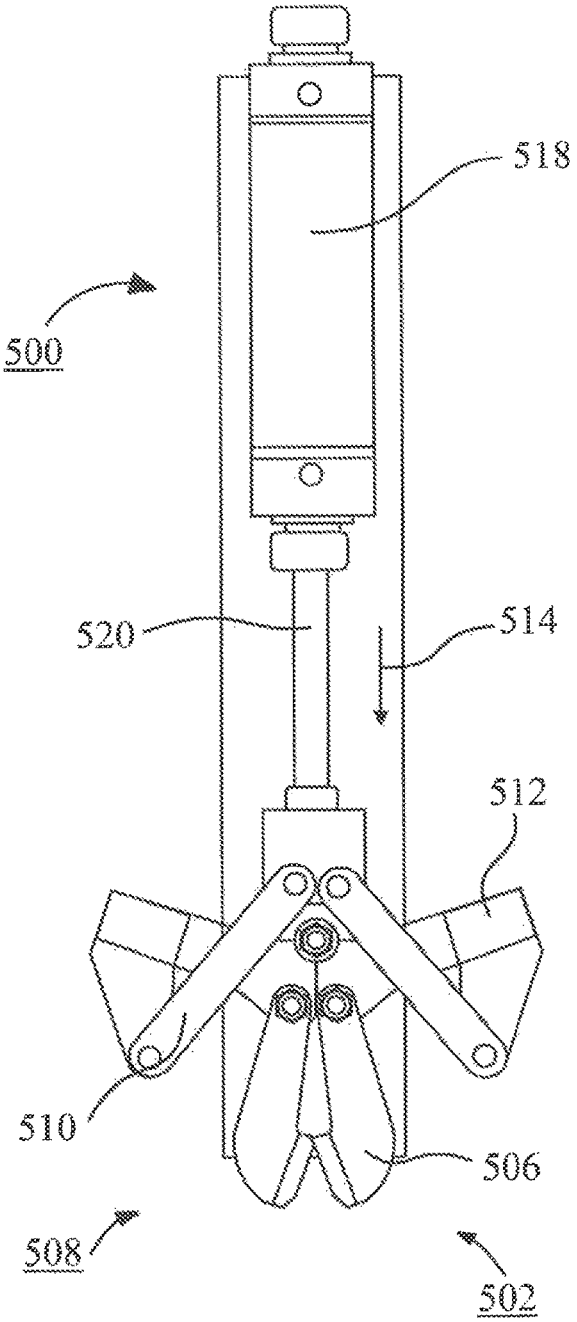
FIG. 5 is a schematic front plan view of the shear actuator in the open position.
Figure 6:
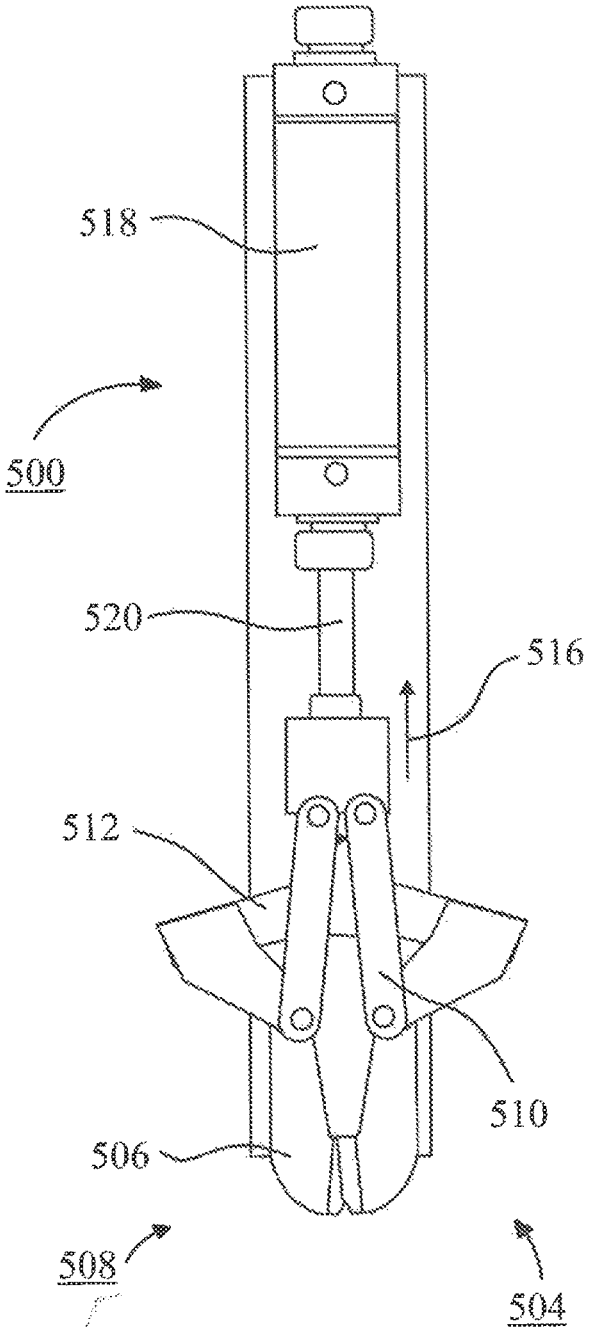
FIG. 6 is a schematic front plan view of the shear actuator in the closed position.

Now referring to FIGS. 5 and 6 which show shear actuator 500 in open position 502 and closed position 504, respectively. Shear actuator 500 is comprised of shear 508 connected to piston rod 520 which is moved by piston 518 in a downward direction 514 to open shear blades 506 or in a upward direction 516 to close shear blades 506.

The movement of piston rod 520 in a downward direction 514 causes the unfolding of straight linkage 510 and L-shaped linkage 512 which in turn opens shear blades 506, as shown in FIG. 5. The movement of piston rod 520 in the upward direction 516 causes straight linkage 510 and L-shaped linkage 512 to fold together to cause shear blades 506 to close, as shown in FIG. 6.

Figure 7:
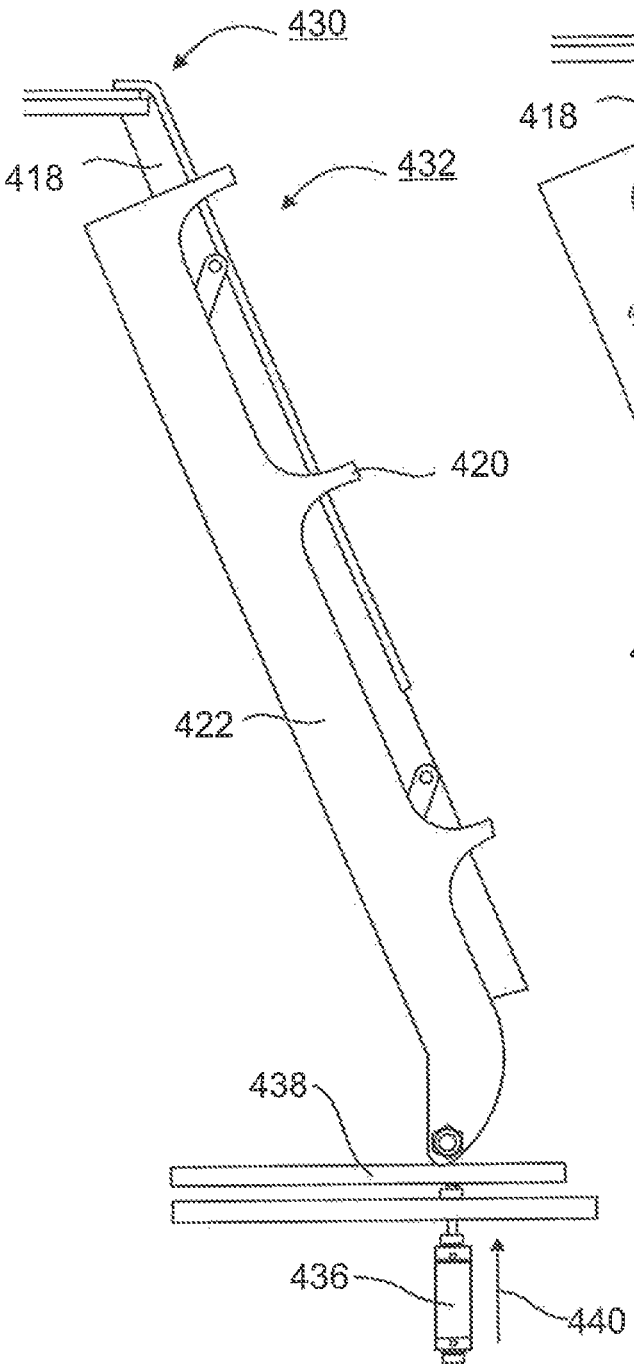
FIG. 7 is a schematic side plan view of the prong retraction mechanism in the extended position.
Figure 8:
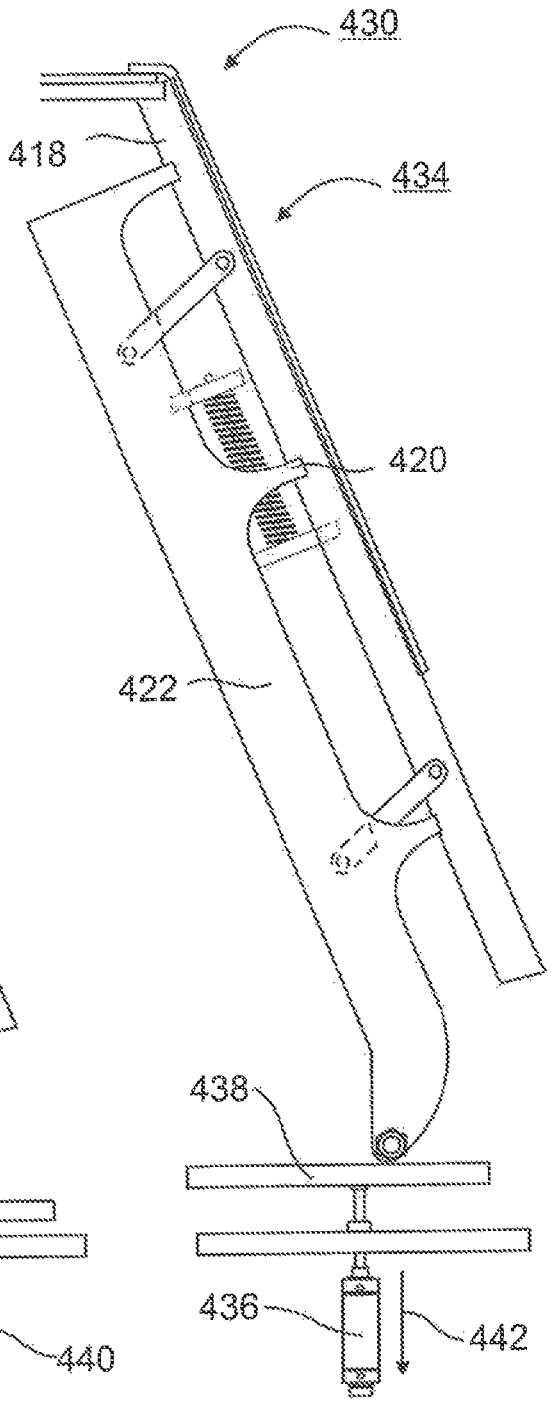
FIG. 8 is a schematic side plan view of the prong retraction mechanism in the retracted position.

Referring now to FIGS. 7 and 8 which depict the retraction and extension action of side plates 422 of copper arms with prongs 418 using prong retraction mechanism 430. FIG. 7 shows side plate 422 in the extended position 432 positioning prongs 420 extend above copper arm with prongs 418 held in this position by springs. To move side plate 422 to the retracted position 434 (shown in FIG. 8) where positioning prongs 420 are below copper arm with prongs 418, release actuator 436 is moved in the retract direction 440 which lifts fixture ring 438 upwards, and which moves side plate 422 to the retracted position 434. Moving release actuator 436 down in direction 442 which allows the spring to extend the prongs 420 above the copper arms and into the extended position 432.

The reader will note referring to FIGS. 7 and 8 that a copper arm with prong 418 is depicted in FIGS. 7 and 8. Copper arm with prongs 418 includes copper arms without prongs 416 with additional side plates 422 on each side of copper arm without prongs. Copper arm without prongs includes a top end 473, bottom end 475. The side plates 422 include a lower portion 481, a roller 477, and a lower tip 485 which is the end of roller 477. Additionally, side plates 422 include upper portion 479. All copper arms include copper arms without prongs 416. In addition, every other arm includes copper arms with prongs 418, which is the addition of the side plates 422 which are hinged on to the copper arm without prongs 416 with pivoting links two of which are shown in FIG. 7 and two of which are shown in FIG. 8. The reader will note that there are a total of four pivoting links, two on each side of copper arm without prongs 416, two for attaching a left side plate 422 and two for attaching the right side plate 422 to the copper arm.

The reader will also note that top plate 410 has an upper diameter 489 and there is a lower diameter 487 which is the distance of the lower tips 485 to the common center line of the wire basket apparatus.

Please note that the wire basket apparatus rotates about this center line which is shown as small vertical lines in FIG. 7, at the end of upper diameter 489 and lower diameter 487 and runs through the geometric center of main shaft 402 in a vertical direction. The axis of rotation lies on what is normally referred to as a "z" axis.

Figure 9:
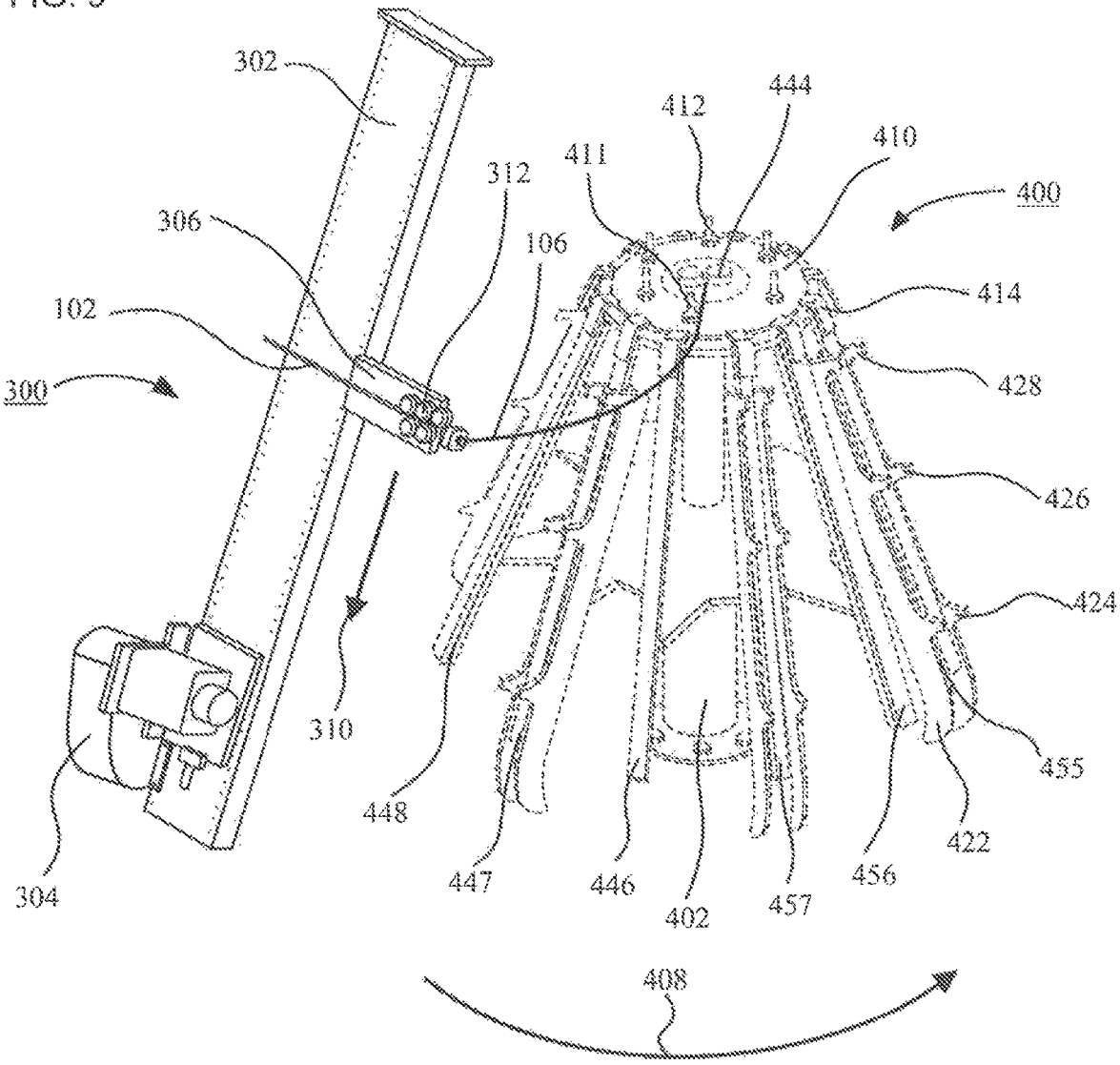
FIG. 9 is a schematic top front left perspective view of the spinning fixture in combination with the traverse drive showing the initial wire forming path.

FIG. 9 shows traverse apparatus 300 in combination with spinning fixture 400, laying down wire 102 along the initial portion of wire forming path 106. Traverse apparatus 300 is comprised of traverse guide 302, with wire feed 306 which is moved along the length of traverse guide by traverse drive 304. Wire feed 306 includes tensioner 312 that straightens the wire 102 and keeps it taut as it is laid over spinning fixture 400 in the wire forming path 106. At the start of the wire forming path 106, wire 102 is affixed in wire jam cleat 444 on top plate 410 of spinning fixture 400. It wraps around first pin 411, going over the arm shoulder 414 of first copper arm 446 and abutting against upper prong 428 of second copper arm 447. Wire feeder 306 moves in traverse downward direction 310 as spinning fixture 400 rotates in spin direction 408.

Figure 10:
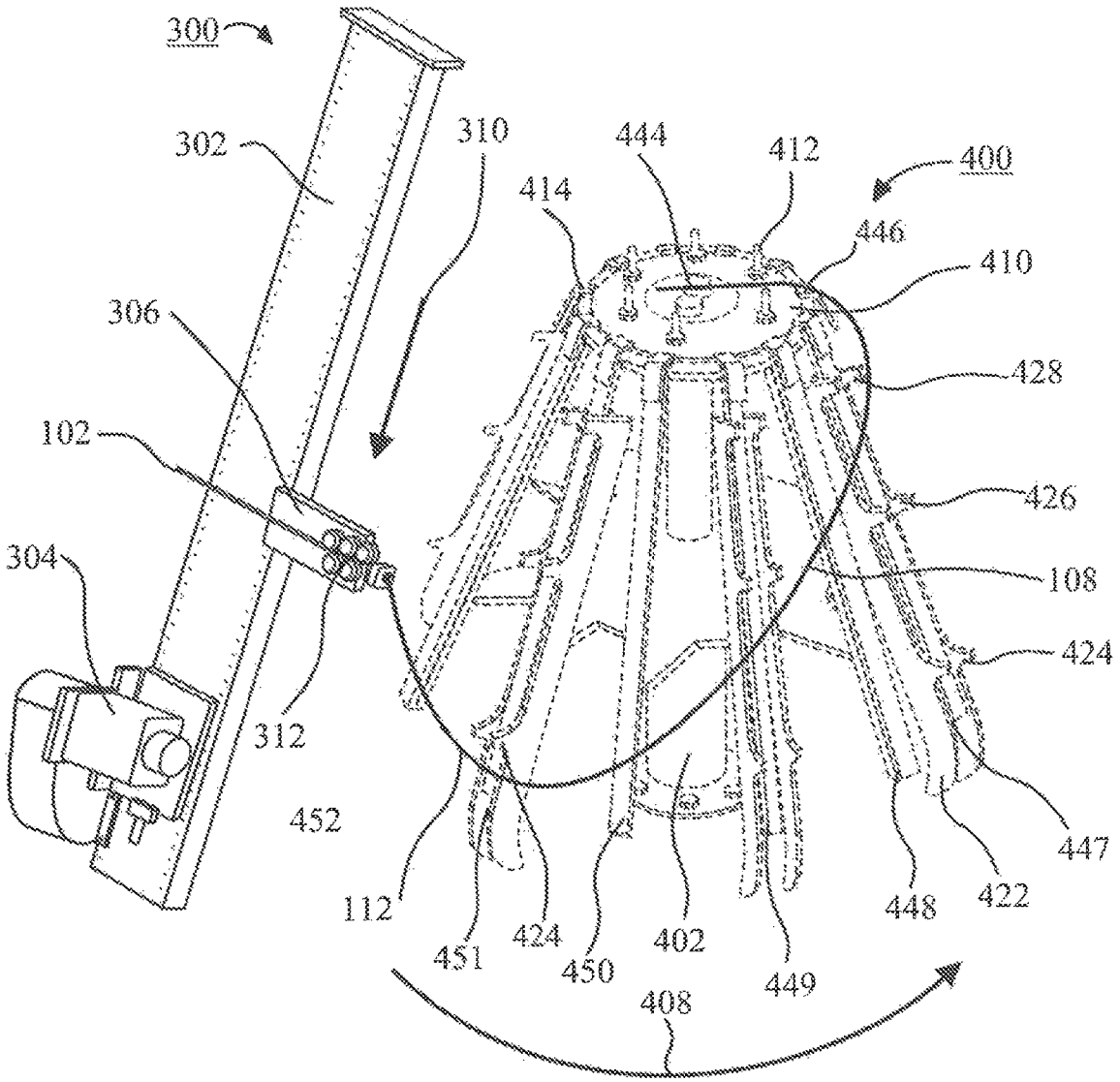
FIG. 10 is a schematic top front left perspective view of the spinning fixture in combination with the traverse drive showing the wire forming path during the first rotation of the spinning fixture.

FIG. 10 shows the complete first downward leg of the wire forming path 112 which is formed first by the traverse downward direction 310 of wire feed 306 while spinning fixture 400 rotates in spin direction 408. Wire 102 wraps around first copper arm 446, second copper arm 447, third copper arm 448, fourth copper arm 449, fifth copper arm 450 and sixth copper arm 451. Wire 102 abuts against upper prong 428 of second copper arm 447, the middle prong 426 of fourth copper arm 449 and the lower prong 424 of sixth copper arm 451. Once wire feed 306 has reached the bottom of traverse 302, wire 102 is abutting against lower prong 424 of sixth copper arm 451. Traverse drive 304 changes the direction of wire feed 306 to move in the traverse upward direction 308, shown in FIG. 11, which causes wire 102 to wrap around lower prong 424 of the sixth copper arm 451, anchoring wire 102 as it begins being laid in the upward leg of wire forming path 114.

Figure 11:
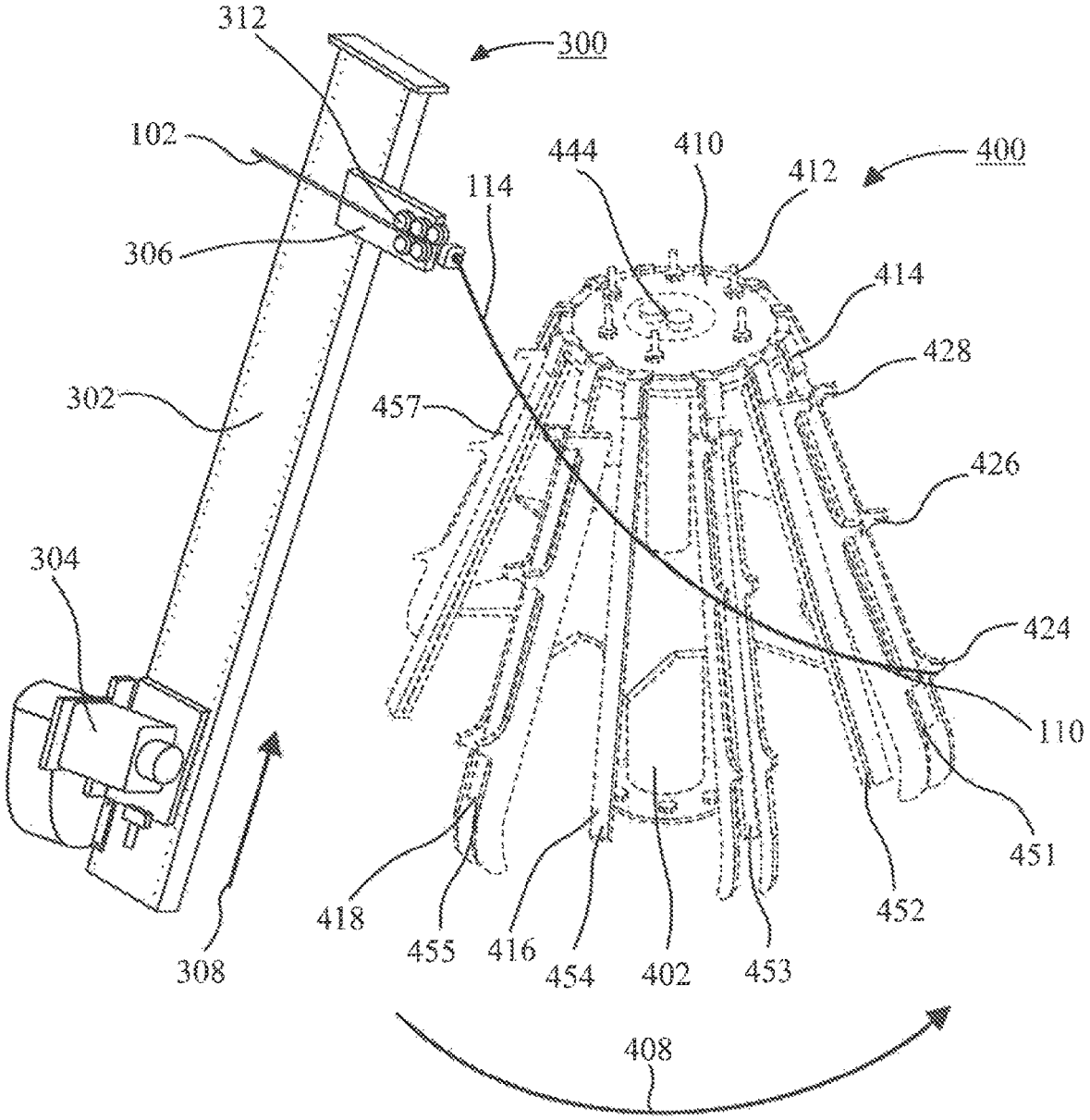
FIG. 11 is a schematic top front left perspective view of the spinning fixture in combination with the traverse drive showing the wire forming path with the wire feed traversing upwardly.

FIG. 11 shows the upward leg of wire forming path 114 which is laid when the wire feed 306 is moved from the bottom of traverse 302 towards the top of traverse 302 in the traverse upward direction 308 while spinning fixture rotates in the spin direction 408. Wire 102 is laid around sixth copper arm 451, seventh copper arm 452, eighth copper arm 453, ninth copper arm 454, tenth copper arm 455, eleventh copper arm 456 and twelfth copper arm 457. Wire 102 wraps around the lower prong 424 of sixth copper arm 451 abuts against middle prong 426 of eighth copper arm 453 and upper prong 428 of twelfth copper arm 457. Then it traverses across the top plate to start another loop and after completing six loops it will eventually close off the bottom of the wire basket as seen in FIG. 13.

Figure 12:
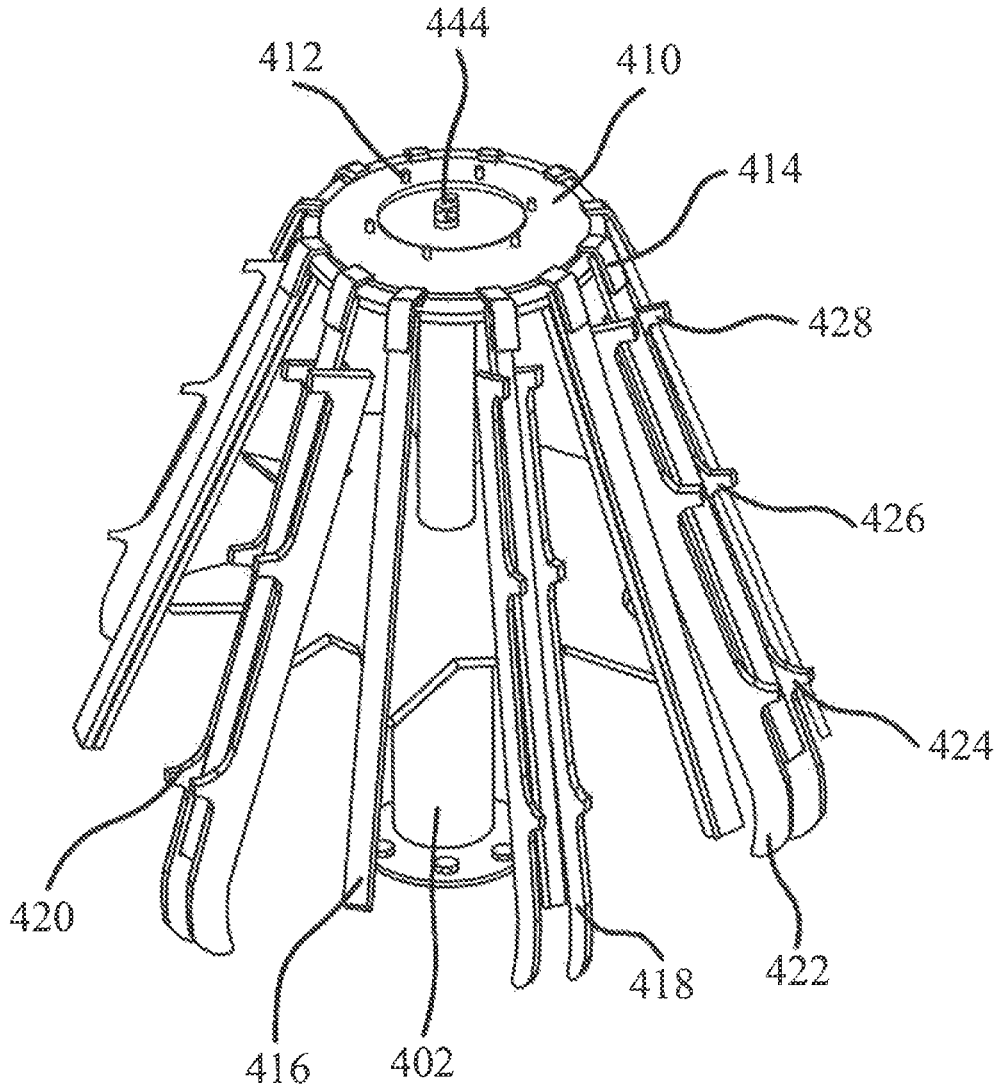
FIG. 12 is a schematic top perspective view of the spinning fixture.
Figure 13:
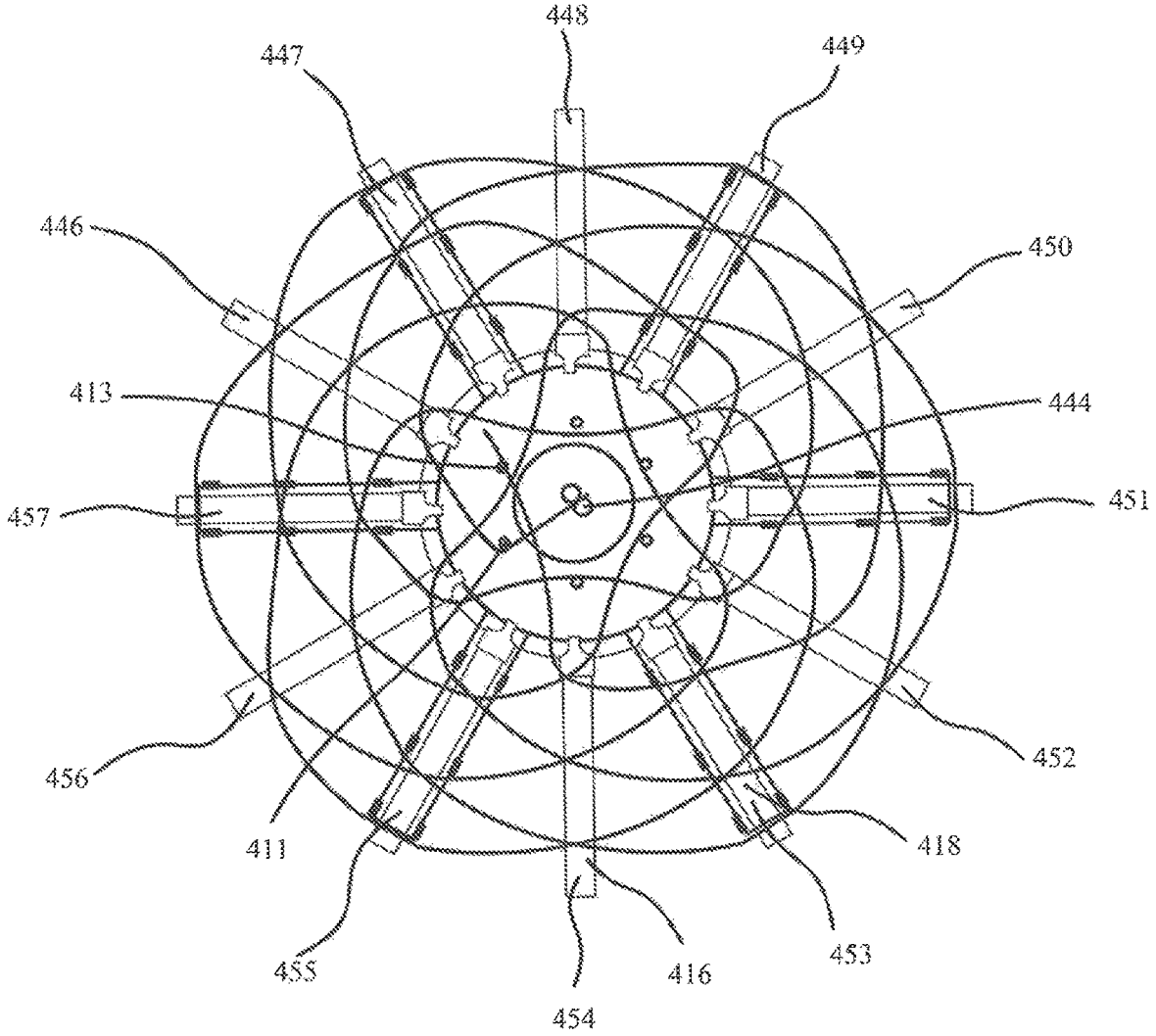
FIG. 13 is a schematic top end view of the spinning fixture, with a complete wire basket positioned on the spinning fixture.

FIG. 12 shows spinning fixture 400 in isolation and FIG. 13 shows a top end view of spinning fixture 400 with the complete wire forming path 106 shown in relation to the copper arms. First wire forming path 112 is also known as downward wire forming path 108 because wire feeder 306 moves in the traverse downward direction 310 while laying the path and second wire forming path 114 is known as upward wire forming path 110 because wire feeder 306 moves in the traverse upward direction 308 while the wire is laid. Wire 102 is alternately laid in a downward wire forming path 108 and an upward wire forming path 110 five more times after the first wire forming path 112 and second wire forming path 114 are laid In total seven complete rotations of the spinning fixture is required to complete one wire basket.

One loop takes in 420° of rotation whereas 6 loops take in 2520° of rotation. Downward wire forming paths 108 are started on odd-numbered copper arms starting at first copper arm 446, i.e., first copper arm 446, third copper arm 448, fifth copper arm 450, seventh copper arm 452, ninth copper arm 454 and eleventh copper arm 456. Upward wire forming paths 110 are started at the lower prong 424 on even-numbered copper arms, starting at sixth copper arm 451, i.e., sixth copper arm 451, eighth copper arm 453, tenth copper arm 455, twelfth copper arm 457, second copper arm 458, and fourth copper arm 449. The last upward wire forming path starts at the lower prong of fourth copper arm 449 and terminates at second top pin 413, completing the wire basket 104.

When a new downward wire forming path 108 is started, the wire crosses over top plate 410 from the upper prong 428 of the last copper arm in the previous upward wire forming path 410 to the arm shoulder of the starting copper arm without prongs 416 that starts the next downward wire forming path 108. The steps in forming a wire basket 104 are described in greater detail in FIGS. 16 and 17.

Figure 14:
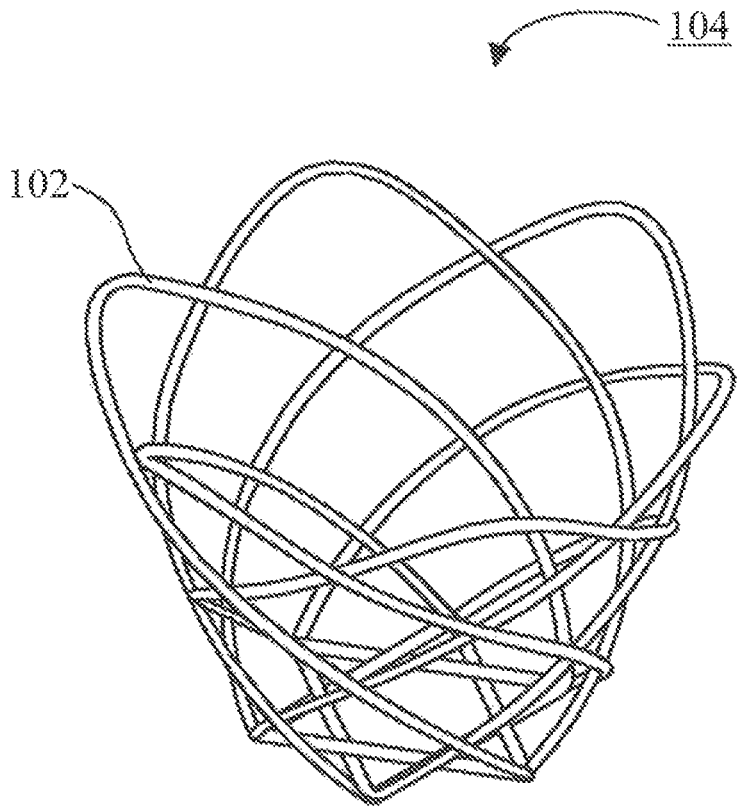
FIG. 14 is a top perspective view of a complete wire basket, in an upright position.
Figure 15:
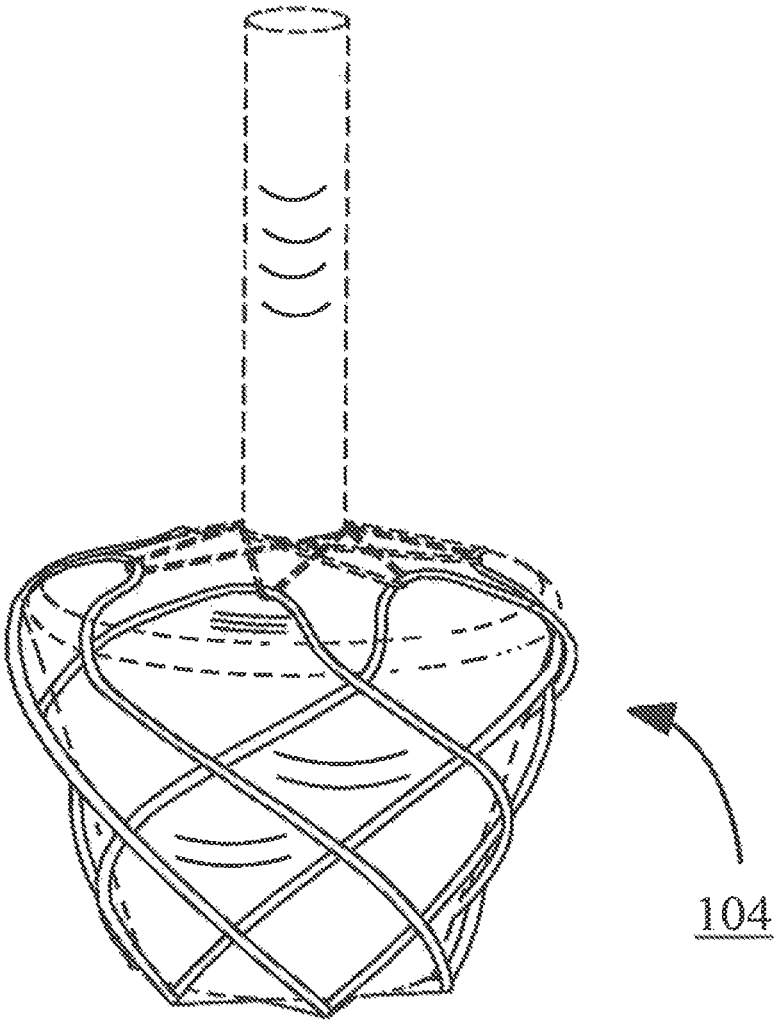
FIG. 15 is a top perspective view of a complete wire basket in use with the root ball of a tree.

FIG. 14 shows a complete wire basket 104 and FIG. 15 shows a complete wire basket 104 in use with a tree and root system.

The copper arms without prongs 416 may be made of other suitable material other than copper. For example, it may be a copper alloy, a brass alloy, an aluminium alloy, or in fact be made of steel or some other metallic material which is suitable for the purpose. The reader will further note that the retractable positioning prongs 420 are retracted in order to remove the completed wire basket from the spinning fixture 400 once the desired pattern has been completed.

In Use

Figure 16:
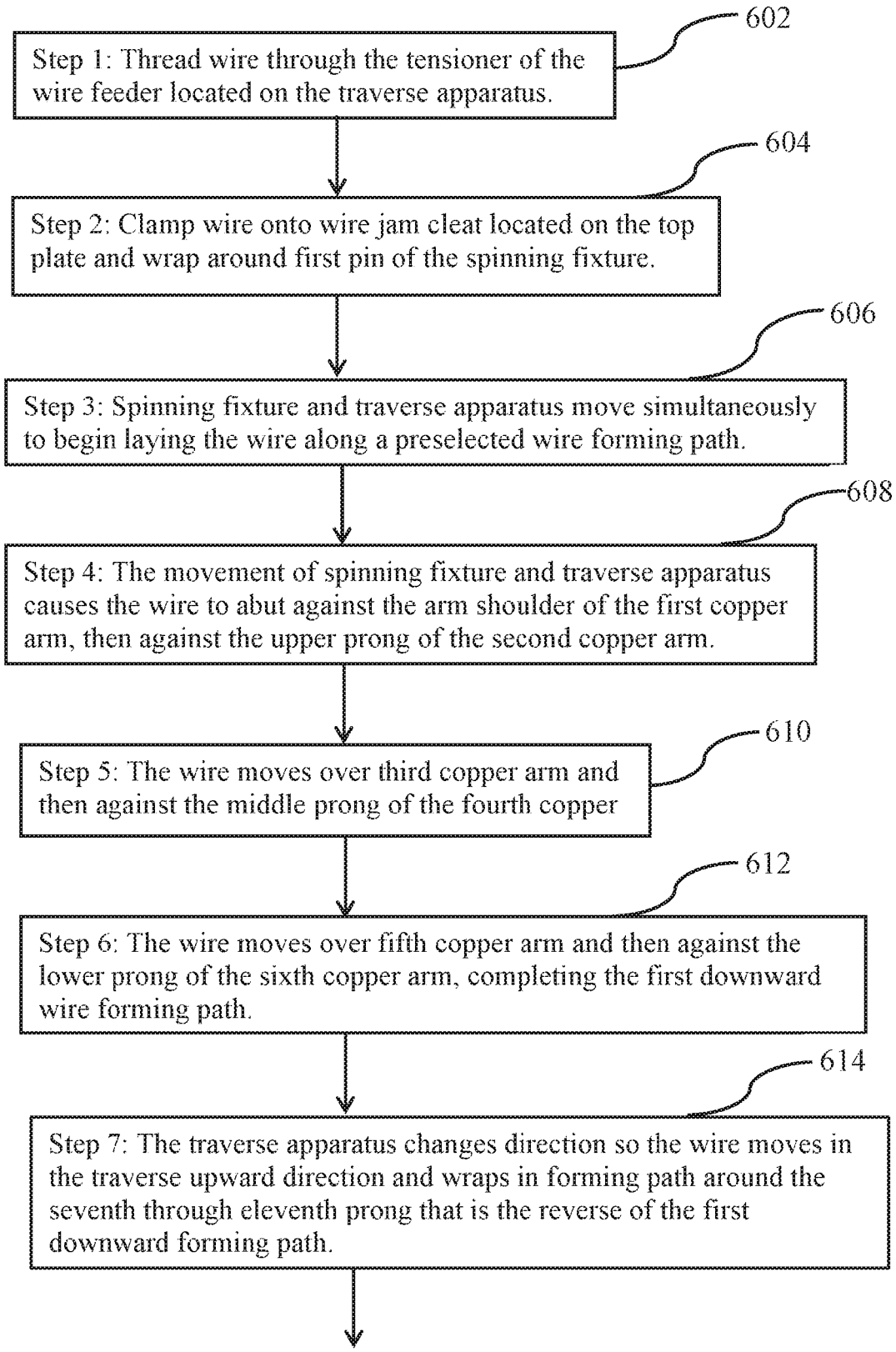
FIG. 16 is a flow chart describing steps 1 through 7 of the method of forming a wire basket with the wire basket former.
Figure 17:
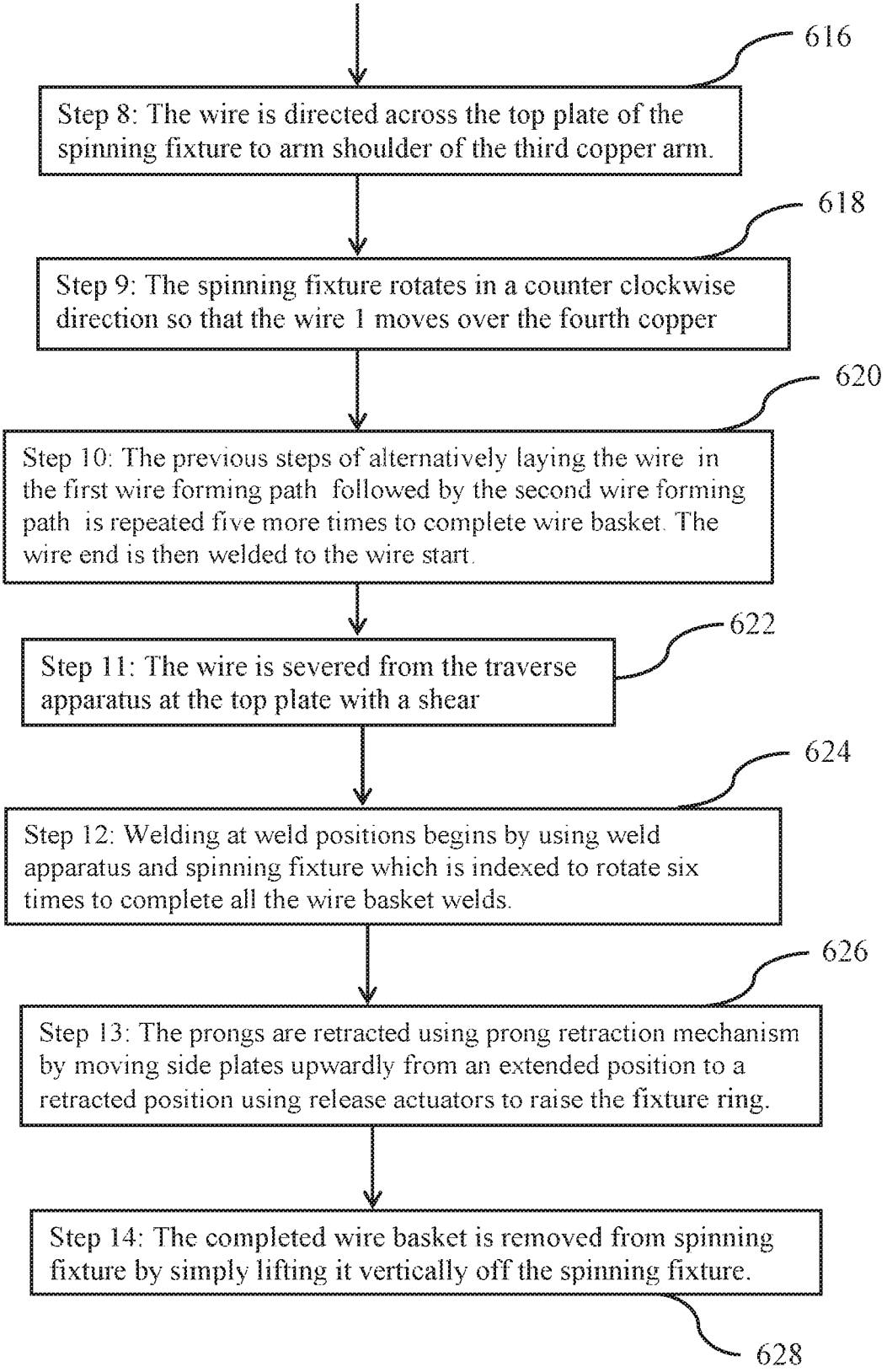
FIG. 17 is a flow chart describing steps 8 through 14 of the method of forming a wire basket with the wire basket former.

FIG. 16 is a flow chart that describes the steps in the method to create a wire basket 104 along wire forming path 106, also depicted in FIGS. 9 through 11.

Step 1, shown as 602: wire 102 is fed through the tensioner 312 of wire feed 306 located on traverse apparatus 300.

Step 2, shown as 604: wire 102 is clamped onto wire jam cleat 444 before being wrapped around first pin 411 located on top of spinning fixture 400.

Step 3, shown as 606: spinning fixture 400 and traverse apparatus 300 move simultaneously to begin laying wire 302 in first wire forming path 112. Spinning fixture 400 turns counter clockwise in spin direction 408 at the same time that wire feed 306 moves down traverse 302 in traverse downward direction 310.

Step 4, shown as 608: The simultaneous movement of wire feeder 306 in traverse downward direction 310 and spinning fixture 400 causes wire 102 to abut against arm shoulder 414 of a first copper arm 446 without prongs then against upper prong 428 of second copper arm 447 with prongs.

Step 5, shown as 610: Wire 102 is then moved over third copper arm 448 without prongs 416 and against middle prong 426 of fourth copper arm 449 with prongs.

Step 6, shown as 612: Wire 102 is moved over the fifth copper arm 450 and then against lower prong 424 of the sixth copper arm 451, thereby completing the first downward wire forming path 108.

Step 7, shown as 614: Traverse apparatus 300 changes direction so that wire feeder 306 moves along traverse 302 in the traverse upward direction 308, beginning an upward wire forming path 110, also called the second wire forming path 114, that loops wire 102 around the seventh through twelfth copper arms. The downward wire forming path 108 is reversed, the upward wire forming path 110 continuing until wire 102 abuts against the upper prong 428 of twelfth copper arm 457.

Step 8, shown as 616: wire 102 is directed across the top plate 410 of spinning fixture 400 to the arm shoulder 414 of the third copper arm 448, which has no prongs.

Step 9, shown as 618: spinning fixture 400 rotates in a counter clockwise direction so that wire 102 moves over the fourth copper bar 449 without prongs.

Step 10, shown as 620: the above steps of alternatively laying wire 102 in a first wire forming path 112 followed by a second wire forming path 114 is repeated five more times to complete wire basket 104.

Step 11, shown as 622: wire 102 is severed from traverse apparatus 300 at top plate 410 with a shear 508.

Step 12, shown as 624: welding at weld positions 210 begins using weld apparatus 200. In each weld position 210, five side welds 212 and one top weld 214 are completed using side electrodes 202 and top electrodes 204, as shown in FIG. 3. Spinning fixture 400 is indexed in the spin direction 408 six times to complete all the wire basket welds, except the very first weld which completed by the second top electrode on the top plate to secure the last portion of wire 102 and prevent the entire unwinding of the basket before welding.

Step 13, shown as 626: prongs 420 are retracted using prong retraction mechanism 430 by moving side plates 422 upwardly using release actuators 436 to raise fixture ring 438 thereby moving side plates 422 from extended position 432, shown in FIG. 7, to retracted position 434, shown in FIG. 8.

Step 14, shown as 628: wire basket 104 is removed from spinning fixture 400 by simply lifting it vertically off spinning fixture 400 after opening the wire jam cleat 444.

Wire basket 104 is made from one continuous length of wire and formed and welded in a single continuous operation and includes a star-shaped closed bottom, as shown in FIGS. 14 and 15.

The advantages of the present invention should be apparent. The present invention provides a method of producing an intricately, symmetrically-patterned wire basket suitable for holding the root systems of trees and shrubs that is nearly fully automated, requiring minimal operator action. The operator is only required to set wire 102 in wire jam cleat 444 at the beginning of the basket forming process and then to release the grippers and remove the basket when it is finished. Due to the diamond shape of wire pattern produced the wire basket will stretch when the top ears are tied together around a tree ball. The basket requires little clamping if any.

The method is fast, efficient and inexpensive as the entire operation is completed with one continuous length of wire and one rotation of the spinning fixture to weld the basket. The size of the basket can be varied by using different sized spinning fixtures and adjusting how far wire feeder 306 travels up and down traverse 302 accordingly. A variety of complex, symmetrical basket patterns with closed bottoms are also possible by varying the number of copper arms and prongs on the spinning fixture.

It should be apparent to persons skilled in the arts that various modifications and adaptation of this structure described above are possible without departure from the spirit of the invention the scope of which defined in the appended claim.

What is claimed is:

1. A device for making a wire basket, comprising:
   a) a rotatable spinning fixture with a circular top plate with an outer periphery;
   b) at least three arms attached at a top end at the periphery of the top plate and projecting downwardly at an angle theta relative to the vertical, such that bottom ends of the arms collectively form a circular arrangement having a diameter greater than the diameter of the top plate;
   c) a traverse apparatus for guiding wire onto the spinning fixture such that, as the spinning fixture is rotated, the wire is wound onto the spinning fixture in a preselected pattern, the traverse apparatus comprising*:*
      a traverse guide oriented parallel to the *at least three* arms, and
      a wire feed movable along a length of the traverse guide *to form wire crossing locations*; and
   [d)] *wherein* the *rotatable* spinning fixture includes contacts to maintain the wire on to the spinning fixture in preselected locations.

2. The device claimed in claim 1, wherein the traverse apparatus further comprises a traverse drive operatively coupled to the wire feed, the wire feed being moveable along the length of the traverse guide by the traverse drive.

3. The device claimed in claim 2, wherein the contacts are prongs which extend away from a top surface of each [arm] *of the at least three arms*.

4. The device claimed in claim 3, wherein each of the *at least three* arms comprises a longitudinal member having the top surface and a pair of side plates *with a first side plate* positioned on [both sides] *a first side* of the longitudinal member *and a second side plate positioned on a side, opposite said first side of the longitudinal member*, each side plate of the pair of side plates having at least two of the prongs extending therefrom.

5. The device claimed in claim 4, wherein the pair of side plates is coupled to the longitudinal member[, the pair of side plates having:
   an extended position, where the prongs extend beyond the top surface of the longitudinal member; and
   a retracted position, where the prongs are situated below the top surface of the longitudinal member].

6. The device claimed in claim 5, wherein each *of the pair of* side [plate] *plates* is coupled to its corresponding longitudinal member with two pivoting links.

7. The device claimed in claim 5, wherein each of the arms further comprises a spring coupled to the pair of side plates to bias the pair of side plates in the extended position.

8. The device claimed in claim 7, further comprising a release actuator operatively coupled to each *of the pair of* side [plate] *plates* to shift the respective side plate into the retracted position.

9. The device claimed in claim 8, further comprising a welding apparatus having *a* welding [electrodes] *electrode* for forming welds at *the* wire crossing locations[on the wire].

10. The device claimed in claim 8, further comprising a fixture ring positioned in contact with the bottom end of each side plate, the release actuator operatively coupled to shift the fixture ring, which in turn shifts each *of the pair of* side [plate] *plates* between the extended position and the retracted position.

11. The device claimed in claim 9, wherein the welding apparatus is oriented parallel to the arms at the angle theta relative to the vertical.

12. The device claimed in claim 11, [further comprising] *wherein the at least three arms comprises* at least three [additional] arms without side plates[, the at least three additional arms being] that are attached at the top end at the periphery of *to* the top plate [alternately with the arms and projecting downwardly at the angle theta relative to the vertical].

13. The device claimed in claim 1, wherein the at least three arms are rigidly attached at the top end at the periphery of the top plate.

14. A method for making a wire basket, comprising:
   a) providing a traverse apparatus comprising a traverse guide and a wire feed movable along a length of the traverse guide, for delivery of wire through the wire feed;
   b) providing a rotatable spinning fixture for winding *the* wire[thereon], the spinning fixture comprising a top plate with an outer periphery and at least three arms attached at a top end at the periphery of the top plate, the at least three arms projecting downwardly at an angle theta relative to the vertical, and positioning the spinning fixture such that the at least three arms are orientated parallel to the traverse guide; and
   c) winding *the wire into* a preselected pattern [of wire] onto the spinning fixture by rotating the spinning fixture while selectively moving the wire feed along the length of the traverse guide.

15. The method claimed in claim 14, wherein the spinning fixture comprises *a plurality of* longitudinal members having a top surface, the winding step further comprising directing the wire onto contacts extending above the top surfaces of the *plurality of* longitudinal members to form the preselected pattern of wire.

16. The method claimed in claim 15, further comprising forming welds at wire crossing locations on the formed wire pattern.

17. The method claimed in claim 16, wherein the spinning fixture comprises side plates coupled to the longitudinal members, the contacts being prongs fixed to the side plates, the method further comprising retracting the side plates such that the prongs are situated below the top surface of the longitudinal member after the winding [and welding] is complete.

[18. The method claimed in claim 17, wherein the preselected wire pattern is a diamond shaped wire pattern formed with a single strand of wire.]

19. The method claimed in claim [18] *17*, further comprising releasably securing an end of the [single strand of] wire to the top plate prior to winding the preselected pattern of wire onto the spinning fixture.

* * * * *